United States Patent
Niwa

(10) Patent No.: US 10,270,316 B2
(45) Date of Patent: Apr. 23, 2019

(54) ELECTRIC POWER TOOL

(71) Applicant: MAKITA CORPORATION, Anjo-shi, Aichi (JP)

(72) Inventor: Akira Niwa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 732 days.

(21) Appl. No.: 14/960,844

(22) Filed: Dec. 7, 2015

(65) Prior Publication Data

US 2016/0211730 A1 Jul. 21, 2016

(30) Foreign Application Priority Data

Jan. 21, 2015 (JP) .................................. 2015-009690

(51) Int. Cl.
| | |
|---|---|
| *H02K 9/28* | (2006.01) |
| *H02K 9/06* | (2006.01) |
| *B25F 5/00* | (2006.01) |
| *H02K 7/14* | (2006.01) |

(52) U.S. Cl.
CPC .............. *H02K 9/28* (2013.01); *B25F 5/008* (2013.01); *H02K 9/06* (2013.01); *H02K 7/145* (2013.01)

(58) Field of Classification Search
CPC .......... H02K 5/14; H02K 5/141; H02K 5/143; H02K 5/145; H02K 5/146; H02K 5/148; H02K 9/06; H02K 9/28; H02K 7/145; B25F 5/008
See application file for complete search history.

(56) References Cited

U.S. PATENT DOCUMENTS

| | | | | |
|---|---|---|---|---|
| 1,754,222 A | * | 4/1930 | Connell | B25F 5/02 173/170 |
| 2,475,560 A | * | 7/1949 | Brown | H02K 9/06 310/216.127 |
| 2,532,823 A | * | 12/1950 | Schumann | H02K 7/145 173/217 |

(Continued)

FOREIGN PATENT DOCUMENTS

| | | |
|---|---|---|
| JP | S52-122803 A | 10/1977 |
| JP | 2000-092794 A | 3/2000 |

(Continued)

OTHER PUBLICATIONS

Apr. 23, 2018 Office Action issued in Japanese Patent Application No. 2015-009690.

*Primary Examiner* — Mohamad A Musleh
(74) *Attorney, Agent, or Firm* — Oliff PLC

(57) ABSTRACT

An electric power tool includes a housing, a commutator motor housed in the housing, and a brush holder disposed in the housing. A fan is disposed to the commutator motor. The brush holder includes a metal sleeve and a resin base. The metal sleeve houses a brush, and the resin base holds the metal sleeve at one surface side of the resin base. The resin base includes an opening portion exposing the metal sleeve to the opposite side surface of the one surface side. The brush holder is disposed in a direction that the resin base is disposed at the fan side such that rotation of the fan causes air suctioned from an air intake opening disposed in the housing at the metal sleeve side to be discharged from an exhaust outlet disposed in the housing at the fan side after passing through the brush holder and a commutator.

16 Claims, 15 Drawing Sheets

(56) References Cited

U.S. PATENT DOCUMENTS

| | | | | |
|---|---|---|---|---|
| 3,119,942 | A * | 1/1964 | Luther | H02K 7/145 173/171 |
| 3,414,747 | A * | 12/1968 | Badcock | H02K 1/185 310/216.124 |
| 4,715,732 | A * | 12/1987 | Sanders | B25F 5/00 310/90 |
| 4,908,538 | A * | 3/1990 | Geberth, Jr. | H02K 5/20 310/227 |
| 2006/0043805 | A1* | 3/2006 | Bradfield | H02K 5/1732 310/68 D |
| 2006/0273685 | A1* | 12/2006 | Wada | H02K 5/141 310/239 |
| 2009/0121579 | A1* | 5/2009 | Finkenbinder | H01R 39/40 310/242 |
| 2014/0001915 | A1* | 1/2014 | Fukase | H02K 9/28 310/227 |
| 2015/0042189 | A1* | 2/2015 | Osborne | H02K 13/10 310/63 |

FOREIGN PATENT DOCUMENTS

| | | |
|---|---|---|
| JP | 2003-153497 A | 5/2003 |
| JP | 2011-244589 A | 12/2011 |

* cited by examiner

ELECTRIC POWER TOOL

BACKGROUND

This application claims the benefit of Japanese Patent Application Number 2015-009690 filed on Jan. 21, 2015, the entirety of which is incorporated by reference.

TECHNICAL FIELD

The present invention relates to an electric power tool such as a vibration driver drill that uses a commutator motor as a driving source.

RELATED ART

In electric power tools such as a vibration driver drill and an impact driver, the electric power tool that uses a commutator motor as a driving source has been known. In this case, a structure, in which a brush holder is held orthogonally to a rotating shaft in a housing and a brush is brought into pressure contact with a commutator that passes through the brush holder, is employed. The brush holder is constituted of a cylindrical metal sleeve, which holds the brush, mounted on a disc-shaped resin base in the radial direction. The brush has slide contact with the commutator by the driving of the commutator motor, which results in generation of heat. Then, the metal sleeve gets high temperature. The rotating shaft of a rotator has a fan for cooling the motor, and this is a countermeasure to cool the brush holder by airflow generated by the fan in the housing. However, since the metal sleeve is mounted on the resin base in close contact, the metal sleeve is not cooled effectively at the mounting surface, and the resin base possibly melts when the metal sleeve gets high temperature. Therefore, Japanese Patent Application Publication No. 52-122803 discloses an invention of a brush holder that is configured to contact with cooling air by disposing a partition plate on a lower surface side of a metal sleeve to form a ventilation gap at the lower side of the metal sleeve, or by forming a cutout part on the metal sleeve.

However, when the brush holder is held in a direction that the metal sleeve is disposed at the opposite side of the fan across the resin base, flow of the cooling air is interfered with the resin base. Then, the cooling air does not flow to the metal sleeve side occurring disturbed flow, or the cooling air flows to the commutator side directly without passing through the metal sleeve. Accordingly, the cooling air is not introduced to the lower side of the metal sleeve to fail to perform cooling effectively.

Therefore, the present invention has an object to provide an electric power tool that ensures to cool a metal sleeve effectively.

SUMMARY

A first aspect of the invention provides an electric power tool that includes a housing, a commutator motor, a fan, and a brush holder. The commutator motor is housed in the housing. The fan is disposed to the commutator motor. The brush holder is disposed in the housing. The brush holder includes a metal sleeve and a resin base. The metal sleeve houses a brush, and the resin base holds the metal sleeve at one surface side of the resin base. The resin base includes an opening portion exposing the metal sleeve to the opposite side surface of the one surface side. The brush holder is disposed in a direction that the resin base is disposed at the fan side such that rotation of the fan causes air suctioned from an air intake opening disposed in the housing at the metal sleeve side to be discharged from an exhaust outlet disposed in the housing at the fan side after passing through the brush holder and the commutator.

BRIEF DESCRIPTION OF DRAWINGS

FIG. 8A is a front view,
FIG. 8B is a rear view,
FIG. 8C is a right-side view,
FIG. 8D is a left-side view,
FIG. 8E is a plan view,
and FIG. 8F is a bottom view.
FIG. 10A is a perspective view,
and FIG. 10B is a front view.
FIG. 11A is a perspective view,
and FIG. 11B is a front view.
FIG. 12A is a plan view,
and FIG. 12B is a bottom view.
FIG. 15A is a rear view,
FIG. 15B is a plan view,
and FIG. 15C is a cross-sectional view taken along the line C-C.

DETAILED DESCRIPTION

Figure 1:
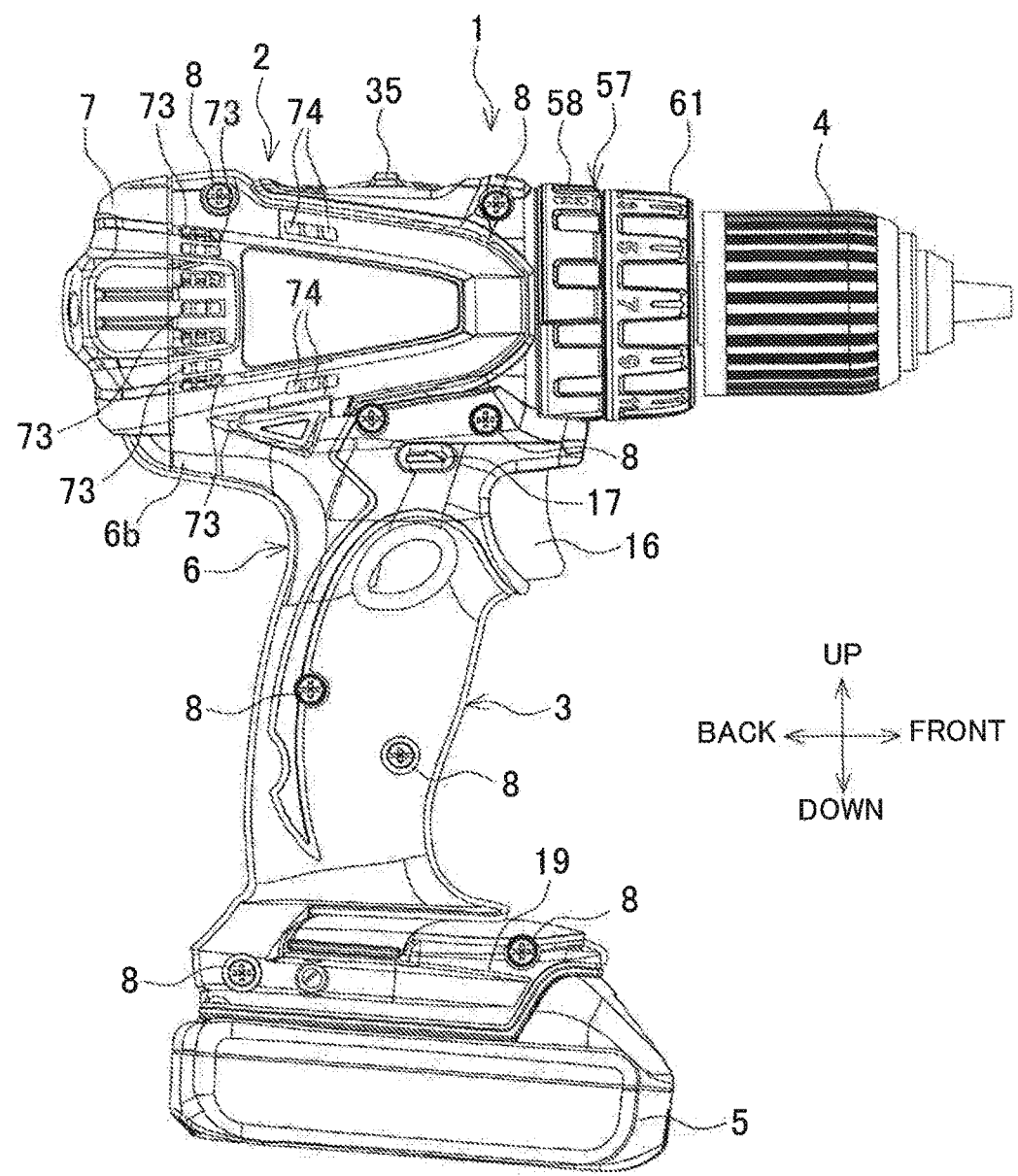
FIG. 1 is a side view of a vibration driver drill.

The following describes embodiments of the present invention with referring to the drawings.

Figure 2:
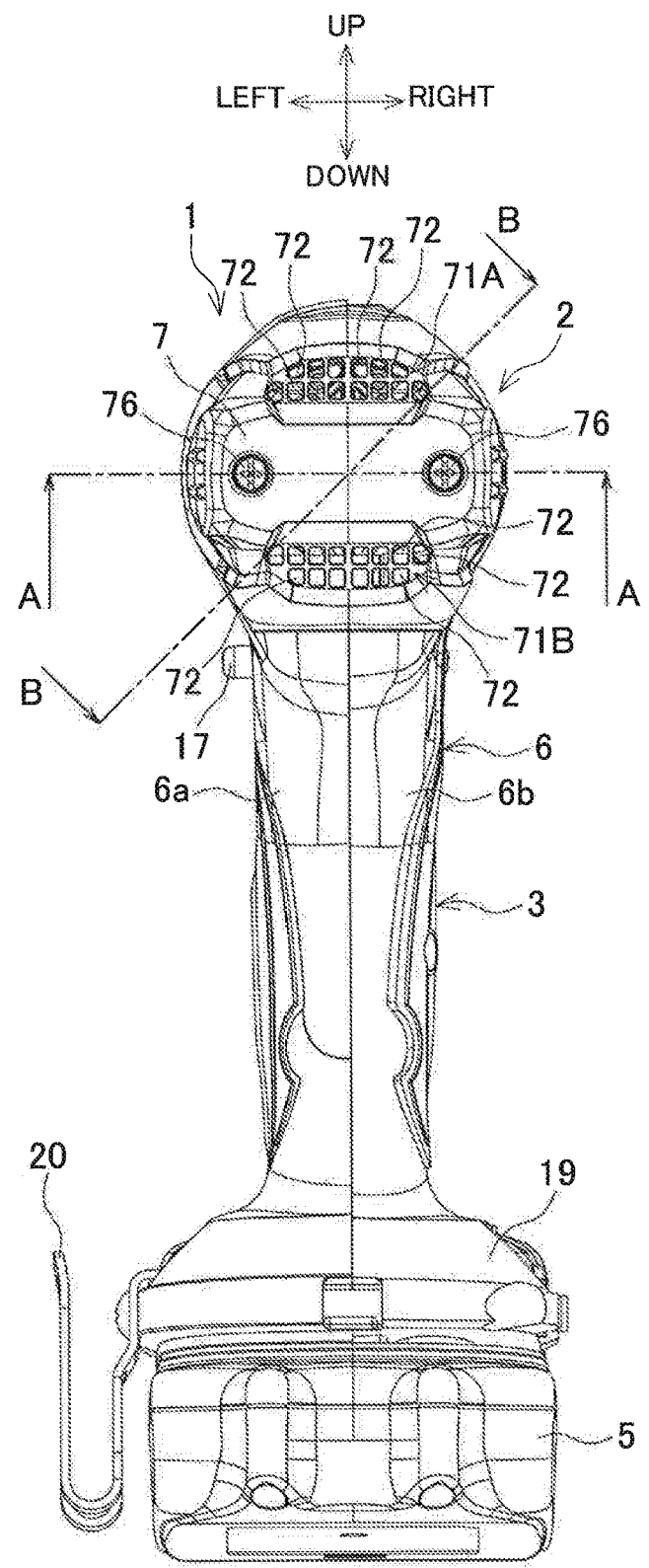
FIG. 2 is a back view of the vibration driver drill.
Figure 3:
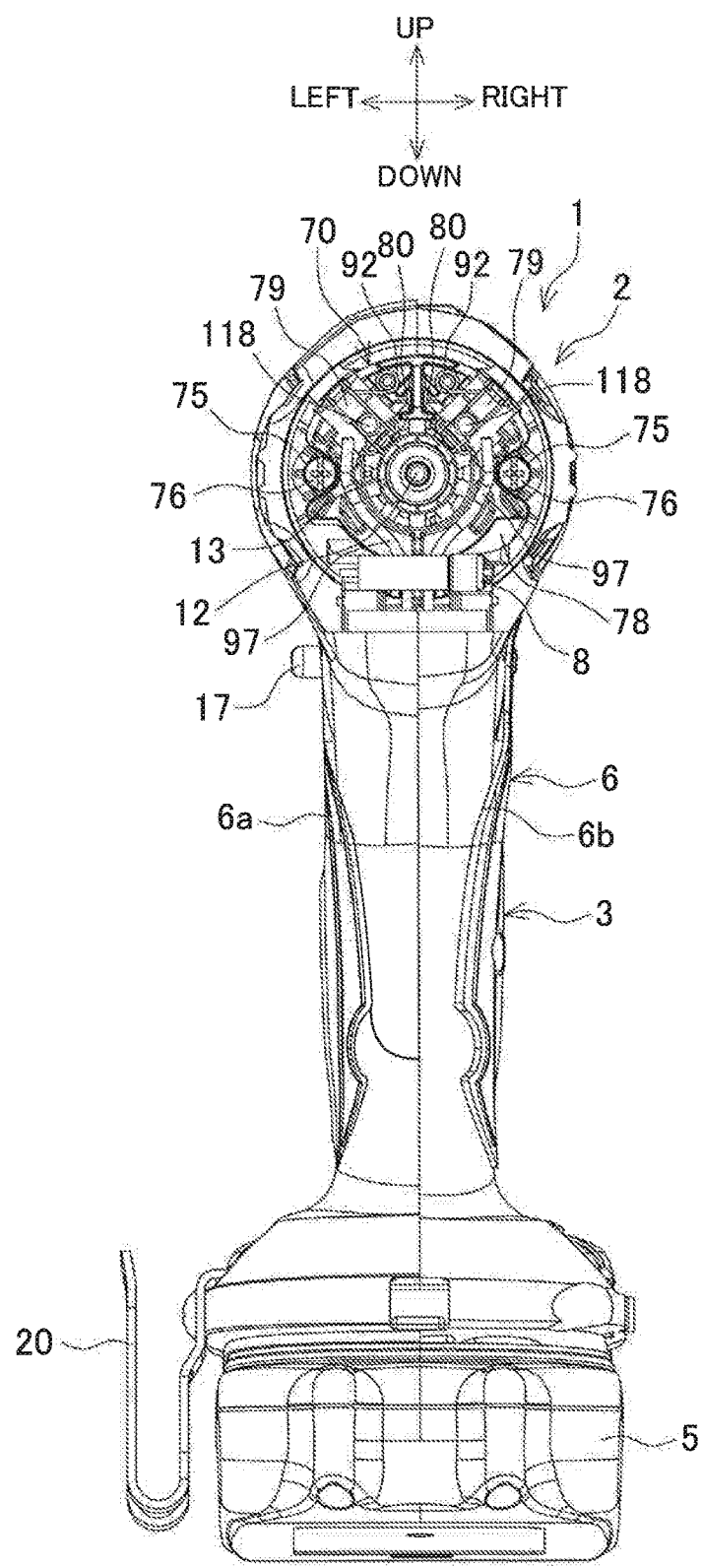
FIG. 3 is a back view of the vibration driver drill in a state where a rear cover is removed.
Figure 4:
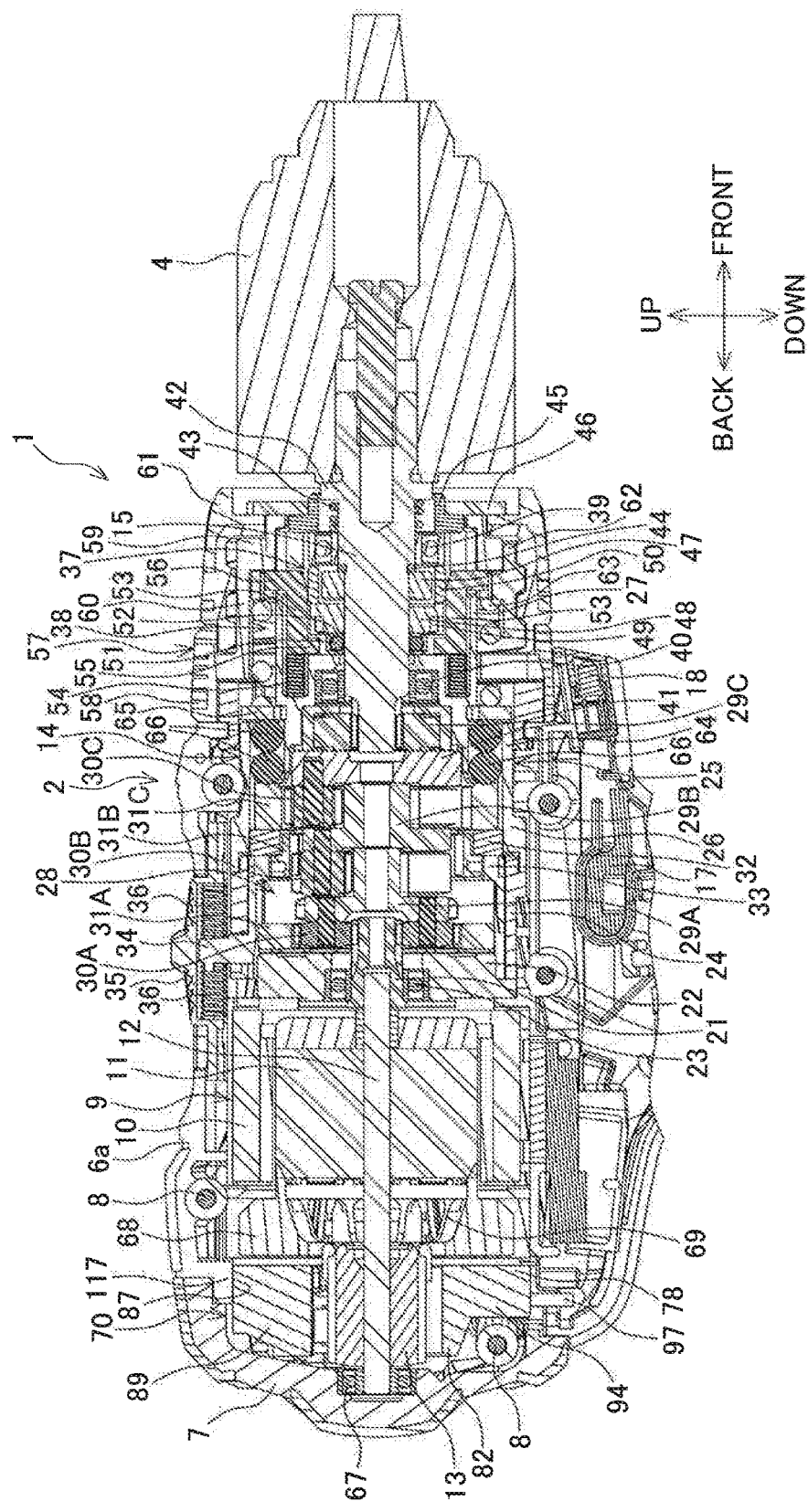
FIG. 4 is a partial vertical cross-sectional view of the vibration driver drill.

FIG. 1 is a side view of a vibration driver drill indicating an exemplary electric power tool. FIG. 2 is a back view. FIG. 3 is a back view in a state where a rear cover is removed. FIG. 4 is a partial vertical cross-sectional view. A vibration driver drill 1 is T-shaped from the side view with a handle 3 projecting from a lower side of a main body 2 extending in the front-rear direction. At a front end of the main body 2, a drill chuck 4, which can grip a bit at the tip, is disposed. At a lower end of the handle 3, a battery pack 5 as a power source is mounted. The housing of the embodiment is constituted of a cap shaped rear cover 7 attached to a rear part of a main body housing 6 where the rear half portion of the main body 2 and the handle 3 are jointly provided. The main body housing 6 is formed of a left half housing 6a and a right half housing 6b attaching by a plurality of screws 8, 8, and so on in the right-left direction.

The main body 2 houses a commutator motor 9 constituted of a stator 10 and a rotator 11 at its rear part. The rotator 11 includes a rotating shaft 12 and a commutator 13. Ahead of the commutator motor 9, a gear assembly 14, which includes a spindle 15 projecting forward from the main body housing 6, is attached so as to transmit rotation of the rotating shaft 12 to the spindle 15 with decelerating the rotation. The drill chuck 4 is mounted at the front end of the spindle 15. In a part at the lower part of the main body 2 and the top part of the handle 3, a switch (not shown) is housed such that a trigger 16 projects forward. On an upper side of the switch, a normal/reverse switching button 17 of the motor rotation is disposed. Ahead of the button 17, an LED 18 that irradiates ahead of the drill chuck 4 is housed in the obliquely upward direction. At the lower end of the handle 3, a mounting portion 19 for the battery pack 5 is disposed. The mounting portion 19 houses a controller (not shown) that is wired to a terminal block, the switch and the commutator motor 9, other than a terminal block to which the battery pack 5 is electrically coupled. A hook 20 is a hook for suspending that is screwed to the left side surface of the mounting portion 19.

Ahead of the commutator motor 9 in the main body 2, a motor bracket 22 is attached. The motor bracket 22 supports a pinion 21 disposed at a front end of the rotating shaft 12 via a bearing 23. The gear assembly 14 constituted of a first gear case 24 and a second gear case 25. The first gear case 24 is cylindrical and coupled to the motor bracket 22. The second gear case 25 is attached ahead of the first gear case 24 and has a two-tier cylindrical shape of a large diameter portion 26 and a small diameter portion 27. The gear assembly 14 internally houses a planetary gear reduction mechanism 28 disposing carriers 29A to 29C in three-tier in the axial direction, and the pinion 21 of the rotating shaft 12 engages with a planetary gear 30A in the first tier. The carriers 29A to 29C support a plurality of planetary gears 30A to 30C revolving in internal gears 31A to 31C. Among the internal gears, the internal gear 31B of the second tier is rotatable and movable back and forth in the axial direction. The internal gear 31B is engageable with a coupling ring 32 that is held in the large diameter portion 26 at a forward position.

On the other hand, at a rear part of the internal gear 31B, a speed switching ring 33, which is movable back and forth, is externally mounted and integrally coupled to the internal gear 31B in the front-rear direction. A coupling piece 34, which is disposed in a protruding state upward from the speed switching ring 33, is coupled to a speed switching lever 35, which is disposed to the main body housing 6 slidably back and forth, via front and rear coil springs 36 and 36.

When the speed switching lever 35 is slid backward, the speed switching ring 33 retreats via the coupling piece 34, and the internal gear 31B integrated with the speed switching ring 33 engages with a gear disposed on the outer periphery of the carrier 29A of the first tier while keeping the engaging with a planetary gear 30B of the second tier. Thus, the speed mode is set to a high speed mode in which deceleration of the second tier is canceled. On the other hand, when the speed switching lever 35 is slid forward, the internal gear 31B moves forward with the speed switching ring 33 apart from the carrier 29A, and engages with the coupling ring 32 while keeping the engaging with the planetary gear 30B of the second tier to regulate the rotation. Thus, the speed mode is set to a low speed mode in which the deceleration of the second tier functions.

Then, here, a vibration mechanism 37 that gives vibration in the axial direction to the spindle 15 is disposed inside the small diameter portion 27 of the second gear case 25, and a clutch mechanism 38 that cuts off a torque transmission to the spindle 15 by a predetermined load to the spindle 15 is disposed outside the small diameter portion 27. By a switching operation described later, any of a vibration drill mode, in which the spindle 15 vibrates while rotating, a drill mode, in which the spindle 15 only rotates, and a clutch mode (driver mode), in which the torque transmission to the spindle 15 is cutoff by the predetermined load, is selected.

The following describes each mechanism.

First, in the vibration mechanism 37, the spindle 15 is journaled by a front bearing 39 and a rear bearing 40 in the small diameter portion 27, and an end of the spindle 15 is spline-coupled to a lock cam 41 integrated with the carrier 29C of the third tier. The spindle 15 is movable back and forth in the axial direction.

However, the spindle 15 is biased at a forward position where a retaining ring 44, which is externally mounted at a rear position of the bearing 39 in an normal state, is in contact with the bearing 39 by a coil spring 43 externally mounted between a flange 42 disposed forward closer of the spindle 15 and the bearing 39. A positioning ring 45 is a positioning ring for positioning the bearing 39 inserted into an inner peripheral of the small diameter portion 27 from the front. A stop plate 46 is a disc-shaped stop plate for retaining the positioning ring 45 screwed at a front end of the small diameter portion 27.

Between the bearing 39 and the bearing 40 of the spindle 15, a first cam 47 and a second cam 48 are externally mounted coaxially with the spindle 15. The first cam 47 and the second cam 48 are ring-shaped and disposed in an order of the first cam 47 and the second cam 48 from the front. The first cam 47 has a first cam gear on the rear surface and is fixedly secured to the spindle 15. The second cam 48 has a second cam gear on the front face and is loosely inserted to the spindle 15. On a rear outer peripheral of the second cam 48, an engaging protrusion 49 is disposed in a protruding state.

Furthermore, ahead of the second cam 48 and between the second cam 48 and the bearing 39, a ring-shaped spacer 50 is disposed. Backward of the second cam 48, a washer 52 is held via a plurality of steel balls 51. Accordingly, the second cam 48 is restricted from moving in the axial direction between the spacer 50 and the washer 52.

On the other hand, the small diameter portion 27 houses a pair of vibration switching levers 53 and 53 slidably at a point symmetry position. The pair of the vibration switching levers 53 and 53 is biased forward by the coil springs 54 and 54 disposed backward of the vibration switching levers 53. At a rear end inner surface side of the vibration switching lever 53, an inside protrusion 55 is disposed in a protruding state projecting to an inner peripheral side of the small diameter portion 27. The inside protrusion 55 is engageable with the engaging protrusion 49 of the second cam 48 at the forward position. At a front end outer surface side of the vibration switching lever 53, an outer protrusion 56 is disposed in a protruding state projecting to an outer peripheral side of the small diameter portion 27.

The small diameter portion 27 has a mode switching ring 57 rotatably on the outer side. The mode switching ring 57 is constituted of an operation ring 58, a cam ring 59, and a coupling plate 60. The operation ring 58 has an approximately identical diameter to the front end of the main body housing 6. The cam ring 59 has a smaller diameter than the operation ring 58 and is positioned forward to the operation ring 58. The coupling plate 60 couples the operation ring 58 to the cam ring 59 and is positioned in the axial direction. The outer protrusion 56 of the vibration switching lever 53 brings in contact with a back end edge of the cam ring 59 in the mode switching ring 57. Accordingly, the vibration switching lever 53 is restricted from moving forward. In this state, while the vibration switching lever 53 is in the retracted position, and causes the inside protrusion 55 to separate from the engaging protrusion 49 of the second cam 48, the cam ring 59 has a cam depressed portion (not shown) at the point symmetry position in a depressed state. Then, at a rotation position of the mode switching ring 57 where the cam depressed portion is positioned forward to the outer protrusion 56, the vibration switching lever 53 moves forward to cause the inside protrusion 55 to engage with the engaging protrusion 49 of the second cam 48.

Next, a description will be given of the clutch mechanism 38.

First, a clutch ring 61, which includes a female thread portion on the inner circumference, is rotatably and externally mounted on the small diameter portion 27 ahead of the mode switching ring 57. Inside the clutch ring 61, a spring holder 62, which causes a male threaded portion formed on the outer circumference to project from a space of the coupling plate 60 of the mode switching ring 57, is externally mounted in a state screwing with the clutch ring 61. The spring holder 62 is movable back and forth in the axial direction in a state where the rotation is restricted. A coil spring 63 is externally mounted on the small diameter portion 27 backward of the spring holder 62. While a front end of the coil spring 63 is held on the spring holder 62, a rear end of the coil spring 63 is in contact with a flat washer 65 disposed on a front face of an obstructing portion 64 between the large diameter portion 26 and the small diameter portion 27.

The flat washer 65 is integrally rotatable with the mode switching ring 57 and is movable in the axial direction independently from the mode switching ring 57. By rotating operation of the mode switching ring 57, a position of the flat washer 65 can be changed to a position where an inner protrusion disposed on the inner circumference (not shown) overlaps a projection disposed on the small diameter portion 27 in the axial direction to restrict to move forward, or a position where the inner protrusion does not overlap the projection to be allowed to move forward.

Two front and rear steel balls 66 and 66 are held on the obstructing portion 64 backward of the flat washer 65 at regular intervals in a circumferential direction. The steel balls 66 are in contact with a front face of the rotatably disposed internal gear 31C on the third tier, and are engageable with clutch cams (not shown) disposed in a protruding state on the front face of the internal gear 31C in the circumferential direction. Biasing force of the coil spring 63 transmits to the internal gear 31C via the steel ball 66 and the flat washer 65, and therefore rotation of the internal gear 31C is restricted. Rotating operation of the clutch ring 61 for screw feeding of the spring holder 62 in the axial direction causes a shaft length of the coil spring 63 to be varied. This allows the biasing force to the internal gear 31C to be changed.

Here, firstly, at a first rotation position of the mode switching ring 57 with a phase that the inner protrusion of the flat washer 65 does not overlap a projection of the small diameter portion 27, the vibration switching lever 53 is in the retracted position without engaging the inside protrusion 55 with the second cam 48 because the cam depressed portion of the cam ring 59 is not in a position ahead of the vibration switching lever 53. Accordingly, the second cam 48 is a state of rotating freely and the flat washer 65 is a state of movable forward. In the above state, the operation mode is set to the clutch mode in which pressing force to the flat washer 65 can be changed by the rotating operation of the clutch ring 61.

In the clutch mode, when push-in operation of the trigger 16 is performed to drive the commutator motor 9, the rotating shaft 12 rotates and the spindle 15 rotates via the planetary gear reduction mechanism 28, so that a driver bit mounted on the drill chuck 4 performs fastening a screw or similar operation. As the screw is fastened and the load to the spindle 15 exceeds pressing force of the coil spring 63 fixing the internal gear 31C, the clutch cam of the internal gear 31C extrudes the steel ball 66 and the flat washer 65 forward so that the internal gear 31C becomes idle. Then, the screw fastening is terminated (clutch actuation). When the driver bit is pressed to the screw, the spindle 15 is retreated and the first cam 47 is engaged with the second cam 48. However, because the second cam 48 is in a state of rotating freely, the second cam 48 rotates with the first cam 47, and no vibration generates on the spindle 15.

Next, at the second rotation position where the mode switching ring 57 is rotated to the left by predetermined angle from the clutch mode, while the cam depressed portion of the cam ring 59 has not come ahead of the vibration switching lever 53 yet and the vibration switching lever 53 stays at the retracted position, the flat washer 65 rotates to cause the inner protrusion to position backward of the projection of the small diameter portion 27. Accordingly, the operation mode is set to the drill mode that the projection constantly restricts the flat washer 65 to move forward regardless of strength of the pressing force of the coil spring 63.

When the spindle 15 is rotated in the drill mode, regardless of the load to the spindle 15, the steel ball 66 is prevented from exceeding the clutch cam of the internal gear 31C. Then, the internal gear 31C stays at the fixed state, and the spindle 15 continues to rotate. In this case, since the second cam 48 stays in a state of rotating freely, no vibration generates on the spindle 15.

Then, at the third rotation position where the mode switching ring 57 is rotated to the left further by the predetermined angle from the drill mode, the cam depressed portion of the cam ring 59 comes ahead of the vibration switching lever 53. This allows the vibration switching lever 53 to move forward and causes the inside protrusion 55 to couple with the second cam 48. On the other hand, the projection of the small diameter portion 27 continues to interfere the inner protrusion of the flat washer 65 in the axial direction. Accordingly, the operation mode is set to a vibration drill mode that the first cam 47 engages with the second cam 48 at the retracted position of the spindle 15.

In the case where the spindle 15 is rotated in the vibration drill mode, when the spindle 15 retreats by pressing a drill bit or similar part to workpiece, the first cam 47, which integrally rotates with the spindle 15, engages with the second cam 48, which is fixed by the vibration switching lever 53. Therefore, vibration generates on the spindle 15. Since the flat washer 65 stays in a state of fixed by the projection, regardless of the load to the spindle 15, the spindle 15 continues to rotate.

Then, in the back of the main body 2, a bearing 67 held onto the rear cover 7 supports an end of the rotating shaft 12 of the commutator motor 9. At a rear of the stator 10 of the rotating shaft 12, a centrifugal fan 68 is disposed. Inside the centrifugal fan 68 and at a rear end surface of the rotator 11, an inside fan 69 is disposed. On the outer periphery side of the commutator 13, a brush holder 70 is disposed. As shown in FIG. 2, on a back surface of the rear cover 7, suction portions 71A and 71B constituted of a group of a plurality of rear air intake openings 72, 72, and so on are disposed separated to upper and lower. At outside of the centrifugal fan 68 on the right and left sides of the main body housing 6, a plurality of exhaust outlets 73, 73, and so on are disposed. Ahead of the exhaust outlets 73, a plurality of front air intake openings 74, 74, and so on are disposed (FIG. 1).

Figure 5:
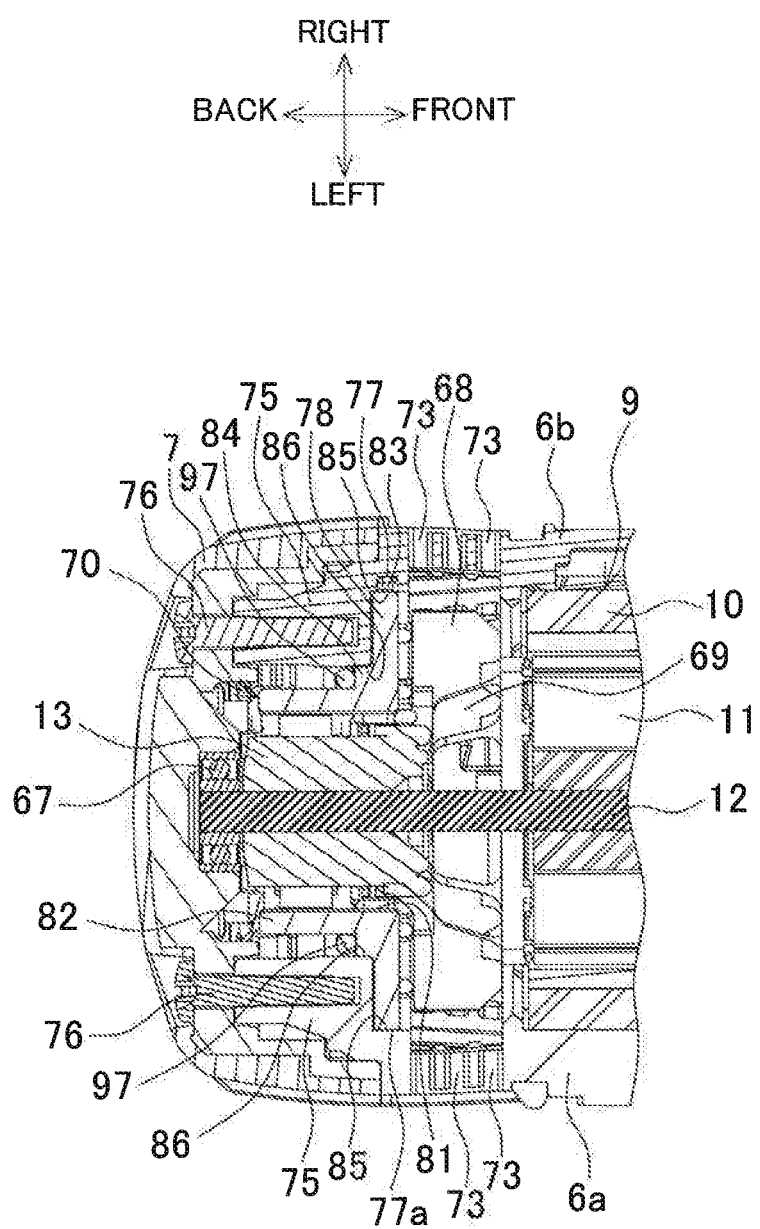
FIG. 5 is a cross-sectional view of the vibration driver drill taken along the line A-A in FIG. 2.

On the left half housing 6a and the right half housing 6b, as shown in FIG. 3 and FIG. 5, a screw boss 75 to fix the rear cover 7 from the back with left and right screws 76 and 76 are formed backward respectively at inside position of the left half housing 6a and the right half housing 6b close to the rotating shaft 12. At the front side of the screw boss 75, a retaining groove 77 holding a resin base 78 of the brush holder 70 is formed.

As shown in FIG. 3, FIG. 5, and FIG. 6 to FIG. 8, the brush holder 70 includes a pair of square cylindrical metal sleeves 79 and 79 holding a carbon brush 80 on a back surface of the disc-shaped resin base 78. The respective metal sleeves 79 and 79 are disposed symmetrically on the upper half side of the resin base 78 in the radial direction in a state of V-shaped in rear view.

Figure 9:
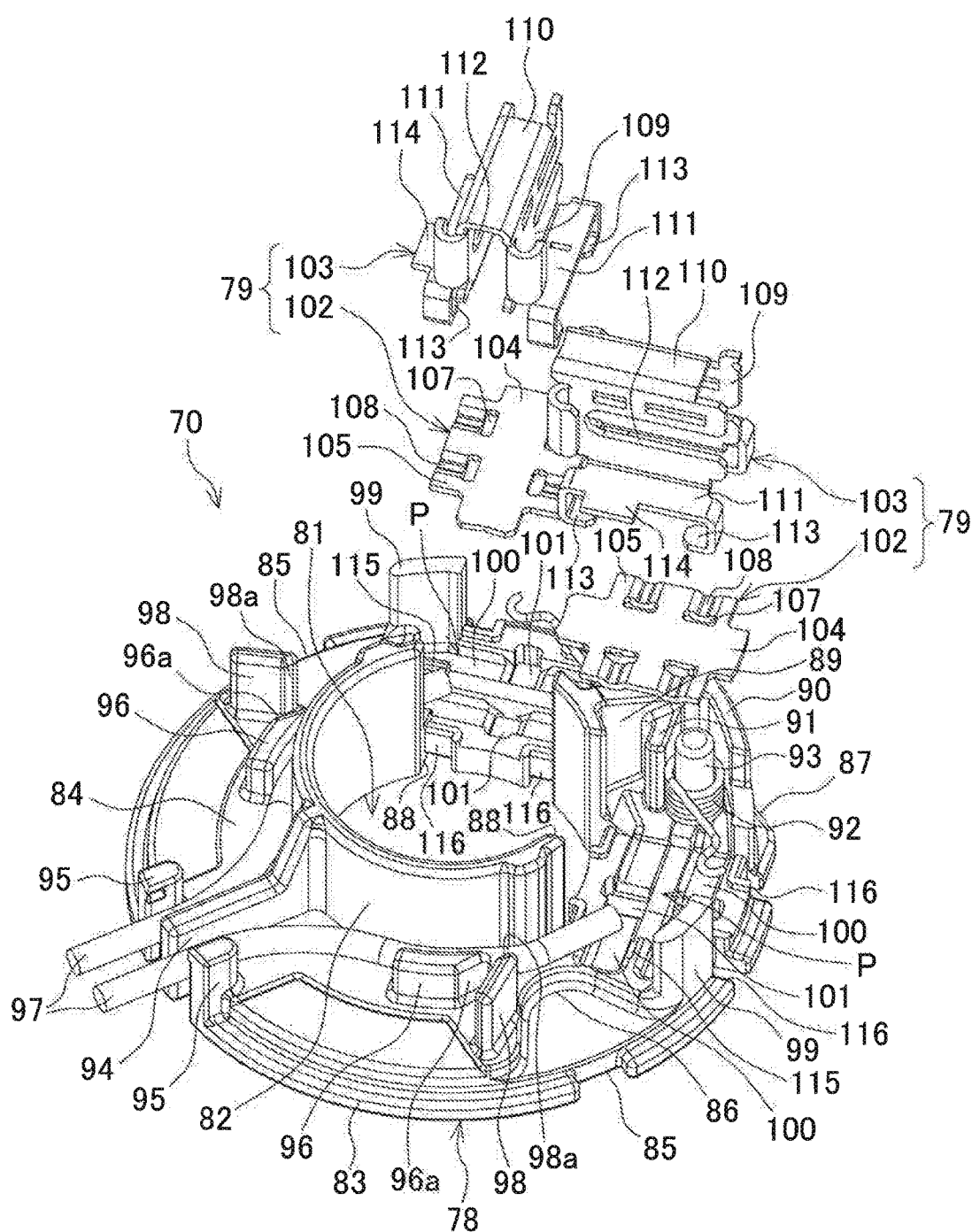
FIG. 9 is an exploded perspective view of the brush holder.
Figure 10A:
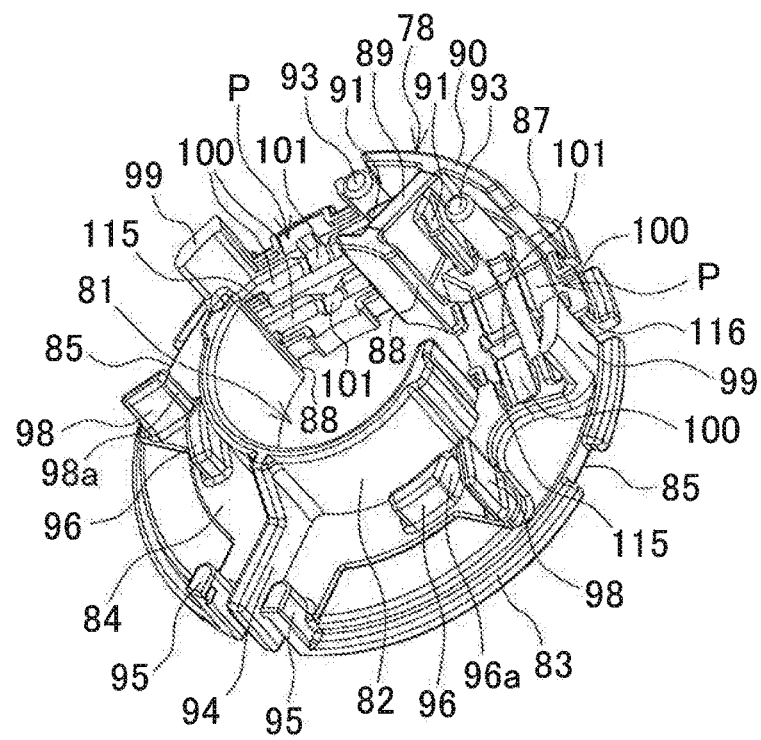
FIGS. 10A and 10B are explanatory views of a resin base.
Figure 10B:
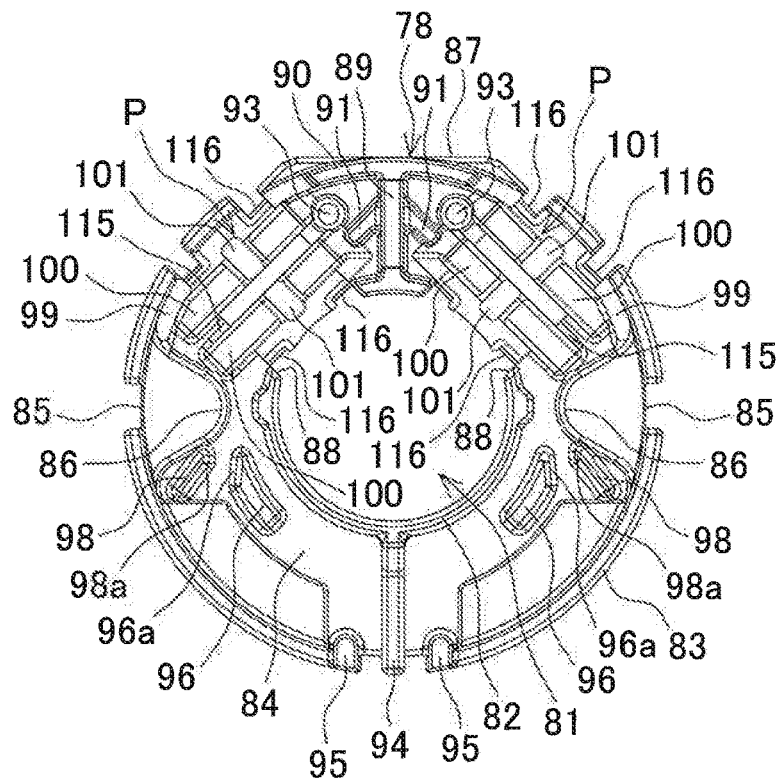
Figure 11A:
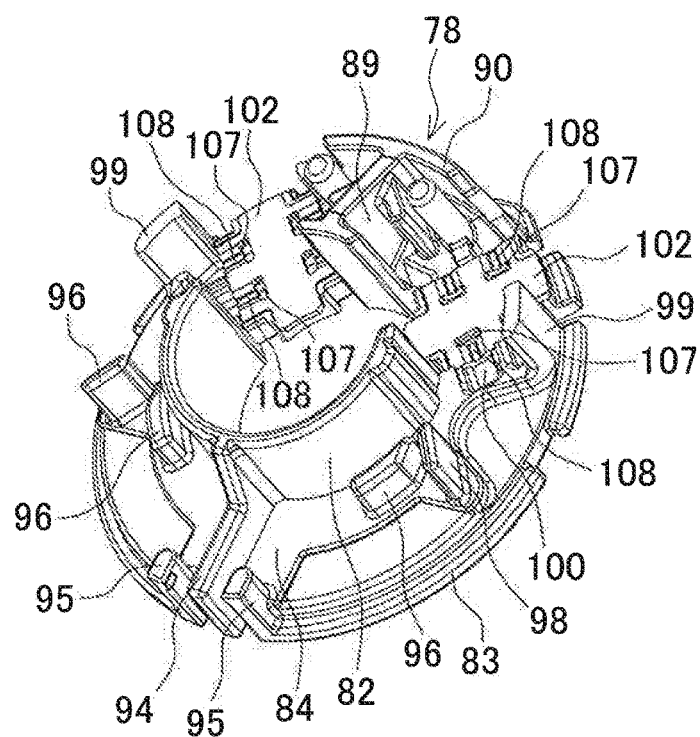
FIGS. 11A and 11B are explanatory views of the resin base that a holder base is set.
Figure 11B:
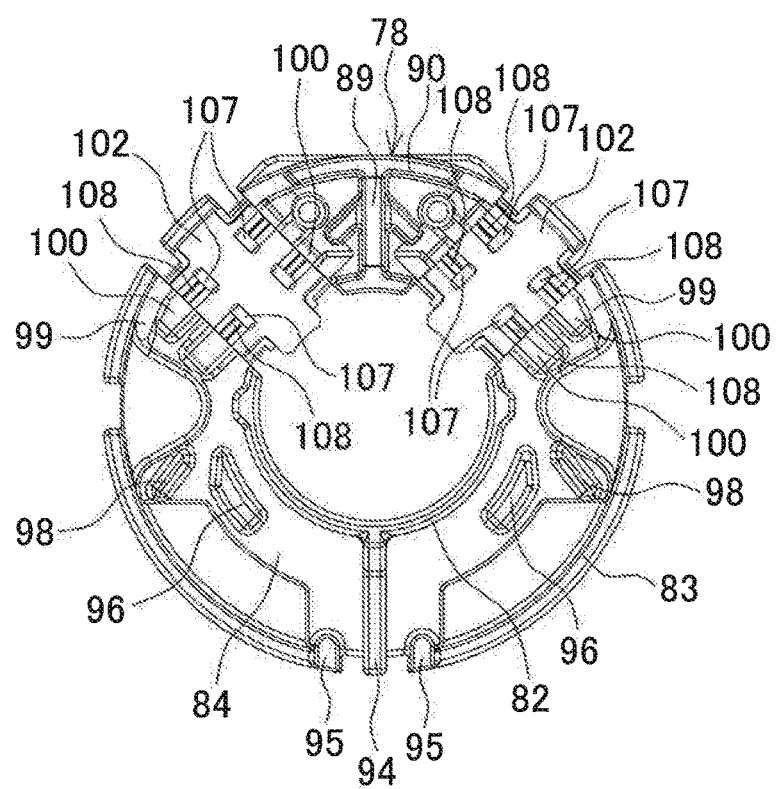
Figure 12B:
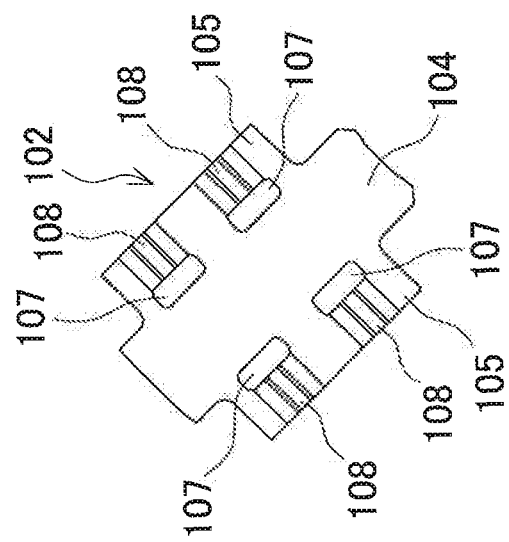
FIGS. 12A and 12B are explanatory views of the holder base.
Figure 12A:
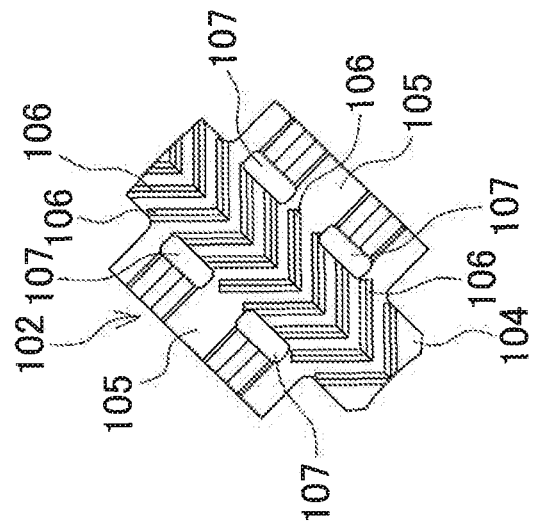

As show in FIG. 9 and FIGS. 10A and 10B, the resin base 78 includes a cylindrical inner rib 82 projecting backward at a penetration hole 81 in the center. While the resin base 78 has a thin portion 83 on the outer periphery, the resin base 78 has a thick portion 84 on the peripheral area of the inner rib 82. On both right and left sides of the thin portion 83, cutouts 85 and 85 for positioning is formed respectively. On both right and left sides of the thick portion 84, fitting portions 86 and 86 of the screw bosses 75 and 75 projecting to the center side is formed respectively. On an upper side of the thin portion 83, a chamfered portion 87 is formed.

The inner rib 82 on the resin base 78 includes a pair of openings 88 and 88 inside mounting portions P and P of the metal sleeves 79 and 79. Between the right and left openings 88 and 88 and the upper side portion of the inner rib 82, an upper rib 89 for partitioning the right side and the left side is installed consecutively in the radial direction. On an upper end of the upper rib 89 and the outer periphery of the resin base 78, an arc-shaped outer rib 90 is installed consecutively. The outer rib 90 projects with the lower projection height than the inner rib 82 and a rear face of the upper rib 89 inclines such that the height of the upper rib 89 becomes lower gradually from the inner rib 82 heading to the outer rib 90.

The upper rib 89 consecutively has inclined ribs 91 and 91 at the right and left sides symmetrically. The inclined ribs 91 and 91 incline toward the right and left mounting portions P and P of the metal sleeves 79 and 79 respectively. At outside of both right and left inclined ribs 91, a mounting boss 93 for fixing a torsion spring 92 is disposed in a protruding state respectively. The torsion spring 92 biases the carbon brush 80.

On the other hand, at the lower center of the inner rib 82, a lower rib 94, which is L-shaped from the side view, is disposed in a protruding state extending from the lower surface of the inner rib 82 in the radial direction. At the right and left sides of a lower end of the lower ribs 94, small ribs 95 and 95 parallel to the lower rib 94 is disposed in a protruding state at an interval from the lower rib 94 respectively. At a lower side of the right and left fitting portions 86 and 86, guide ribs 96 and 96 as a flow guide portion are disposed respectively to protrude curving along with the inner rib 82 outside the inner rib 82. A lead wire 97 coupled to the metal sleeve 79 is wired downward between the guide rib 96 and the inner rib 82 along with the inner rib 82, and pulled out passing through between the lower rib 94 and the small ribs 95 and 95 at both right and left sides of the lower rib 94.

Furthermore, at a lower side of the fitting portions 86 and 86 and the outside of the guide ribs 96 and 96, flow guide ribs 98 and 98 as the flow guide portion are disposed upright respectively inclining in the direction approaching to the inner rib 82 as inclining more in the upper. At an upper side of the fitting portions 86 and 86 and the outside of the mounting portion P of the metal sleeve 79, turbulence ribs 99 and 99 are disposed upright along the circumferential direction. An upper end of each flow guide rib 98 is an inclined surface 98a notched toward the mounting portion P at the upper side respectively. The surface in the flow guide rib 98 side at an upper end of each guide rib 96 is an inclined surface 96a notched approximately parallel to the inclined surface 98a.

Then, the mounting portion P is constituted of a pair of depressed grooves 100 and 100 that are formed parallel to the tangent line direction of the inner rib 82 at a predetermined interval in the radial direction and an opening portion 101 that is formed in the radial direction at the center in a longer side of each depressed groove 100 direction passing through the resin base 78.

The metal sleeve 79 set on the mounting portion P is constituted of a holder base 102 forming the bottom face portion and an upper cylinder 103 that is swaged on the resin base 78 over the holder base 102 to form both side surface and a top surface part of the metal sleeve. As shown in FIGS. 11A and 11B and FIGS. 12A and 12B, the holder base 102 is a metallic plate consecutively installs flange portions 105 and 105 on a longitudinal side of a main body portion 104 in an elongated rectangular shape. The flange portion 105 is elongated rectangular-shaped with shorter longitudinal side than the main body portion 104. A back surface of the main body portion 104 has a plurality of V-shaped cuts 106,106, and so on formed at a predetermined interval in the longer side direction to make the surface uneven shape. On the right and left of the main body portion 104 and each boundary between the main body portion 104 and the flange portions 105 and 105, through holes 107 and 107 in the ellipse shape along the main body portion 104 are formed. Two of the through holes 107 are formed on both right and left boundaries at an interval on a straight line respectively. On outside of each through hole 107 at each flange portion 105, a plurality of projections are formed in the lateral direction projecting to the back side, and a plurality of grooves 108 are formed on a surface in the right-left direction communicating with the through hole 107 on an extension surface of the main body portion 104. A width in the lateral direction of the holder base 102 is smaller than a length of the depressed groove 100 of the mounting portion P.

The upper cylinder 103 is constituted of right and left sidewalls 109 and 109, an upper wall 110 coupling between upper ends of the sidewalls 109 and 109, and right and left folded portions 111 and 111 folded back toward outside at lower ends of the sidewalls 109 and 109. The sidewall 109 includes a cut 112 from an end of the outer peripheral side of the resin base 78 to the inner peripheral side. The cut 112 is a part to avoid interference with an end of the torsion spring 92 pressing the carbon brush 80.

The sidewalls 109 and 109 are folded with an interval identical to the width of the main body portion 104 of the holder base 102. The folded portions 111 and 111 can be mounted on the top surface of the flange portions 105 and 105. At a front end and a rear end in the longer side direction of each folded portion 111, claws 113 and 113 for swaging is formed by folding respectively. One folded portion 111 of the right and left folded portions 111 includes a positioning piece 114 disposed in a protruding state sideways. The positioning piece 114 is fittable to a depressed portion 115 formed at an end of the depressed groove 100 inside the mounting portion P.

Accordingly, the metal sleeve 79 is set on the mounting portion P of the resin base 78 in an order corresponding to the holder base 102 as the first and the upper cylinder 103 as the second. Then, the claw 113 of the folded portion 111 of the upper cylinder 103 is locked to locking depressed portions 116 and 116 and folded back to swage with the holder base 102. The locking depressed portion 116 is formed on the inner periphery and the outer periphery of the resin base 78 respectively. In the above manner, the metal sleeve 79 is mounted on the mounting portion P of the resin base 78. In this state, as shown in FIGS. 8A to 8F and FIG. 14, a back surface of the holder base 102 on which the V-shaped cuts 106 is formed to be exposed to the back surface side of the resin base 78 via the opening portion 101. Both ends of each depressed groove 100 are exposed to both sides of the holder base 102 over ends of the holder base 102. Therefore, a front surface side of the resin base 78 is coupled to the opening portion 101 via the depressed groove 100 as a ventilation passage to communicate with the back surface side of the resin base 78. Furthermore, inside the depressed groove 100, the through hole 107 of the holder base 102 and the groove 108 of the flange portion 105 ensure an upper side of the groove 108 of the flange portion 105 to communicate with the depressed groove 100 and the opening portion 101.

Figure 6:
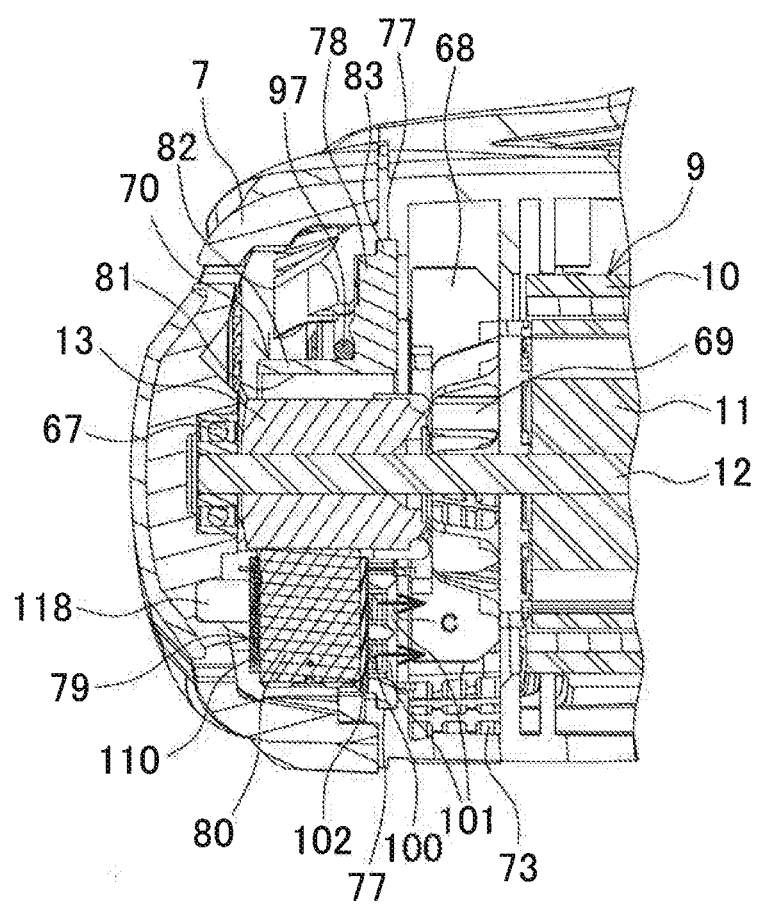
FIG. 6 is a cross-sectional view of the vibration driver drill taken along the line B-B in FIG. 2.
Figure 7:
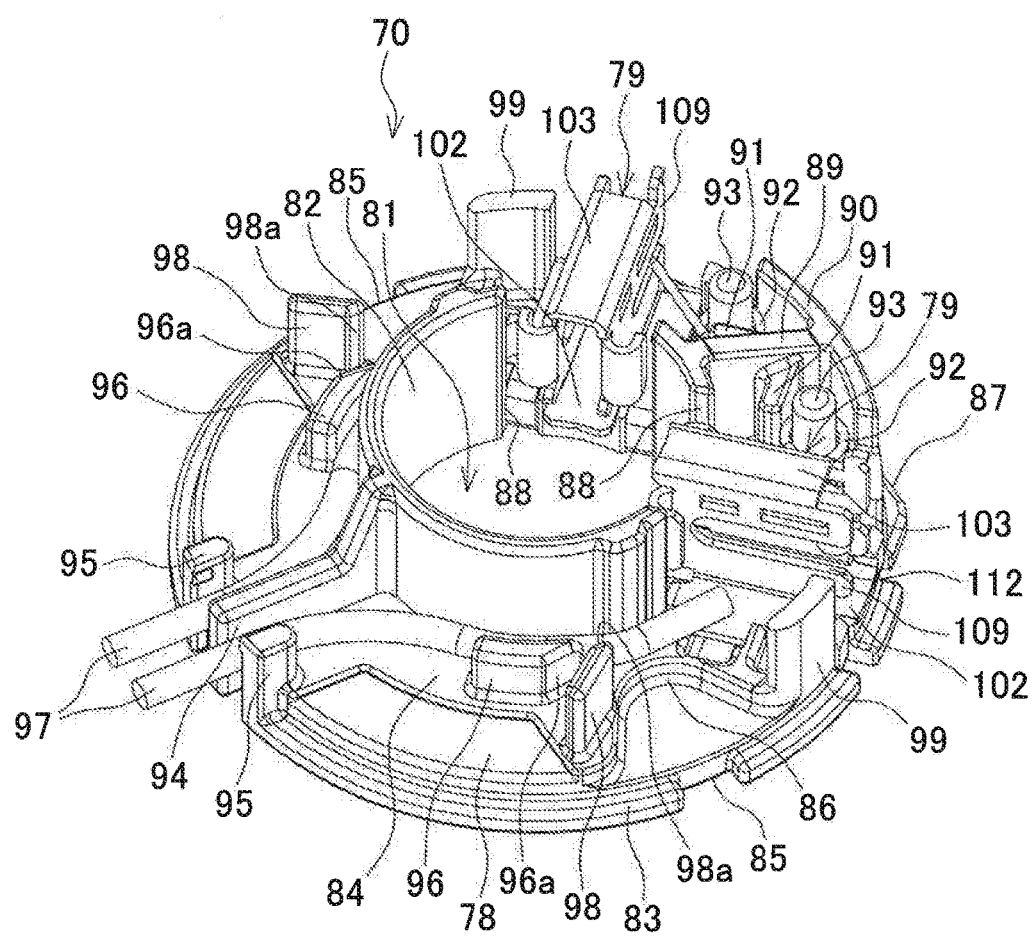
FIG. 7 is a perspective view of a brush holder.
Figure 8:
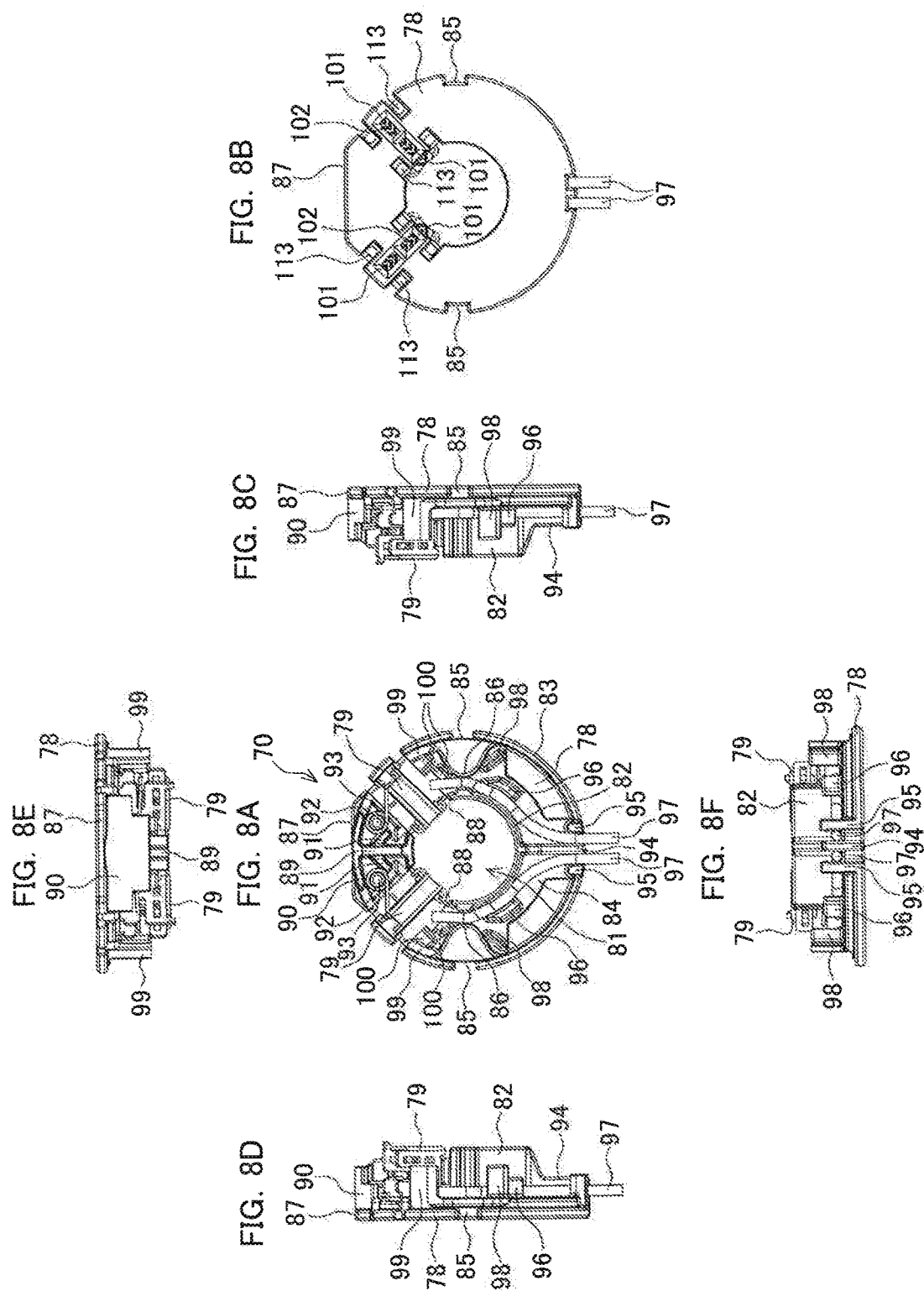
FIGS. 8A to 8F are explanatory views of the brush holder.

As shown in FIG. 5 and FIG. 6, when the left half housing 6a and the right half housing 6b are attached, the retaining grooves 77 and 77 of the respective half housings 6a and 6b are made fit to the respective thin portions 83 of the resin base 78 to cause the respective screw bosses 75 and 75 to fit to the respective fitting portions 86 and 86. Thus, the brush holder 70 is held in the posture perpendicular to the rotating shaft 12 in a rear portion of the main body 2. Here, inside the upper side of both half housings 6a and 6b, a flat portion 117 in contact with the chamfered portion 87 of the resin base 78 is formed (FIG. 4), and a protrusion 77a engaging with the cutout 85 of the resin base 78 is disposed on the retaining groove 77 of the half housing 6a (FIG. 5). This ensures the resin base 78 to be held in a state where the resin base 78 is prevented to rotate with fitting of the screw boss 75 to the fitting portion 86.

Then, inside the rear cover 7 mounted to the screw bosses 75 and 75 by the screws 76 and 76 from backward respectively, pins 118 and 118 in contact with the upper walls 110 and 110 of the metal sleeves 79 and 79 is disposed respectively (FIG. 3 and FIG. 6). Accordingly, the metal sleeves 79 and 79 are pushed from backward with mounting of the rear cover 7, so that the brush holder 70 is held without rattling.

Figure 13:
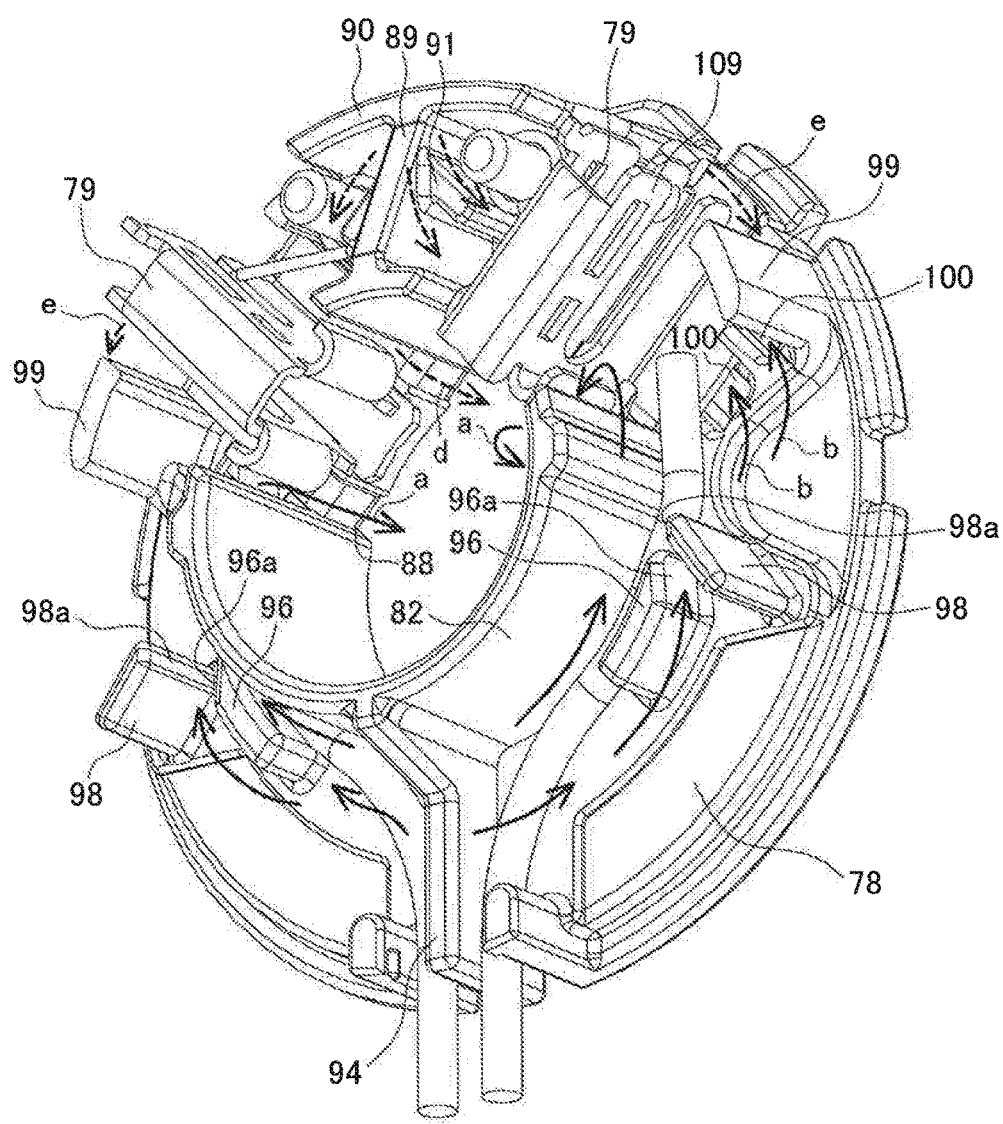
FIG. 13 is an explanatory view indicating the airflow around the brush holder.

In using the vibration driver drill 1 constituted as described above in above-described operation modes, the rotation of the rotating shaft 12 of the commutator motor 9 causes the centrifugal fan 68 and the inside fan 69 to rotate. This makes the fan side a negative pressure. Then, after external air is suctioned from the front air intake opening 74 and passes the commutator motor 9, the external air is discharged from the exhaust outlet 73, and after new external air is suctioned from the upper suction portion 71A and the lower suction portion 71B, and passes the commutator 13 and the brush holder 70, the external air is discharged from the exhaust outlet 73. This airflow cools the commutator motor 9 and the brush holder 70. However, because of positioning of the lower suction portion 71B that is below the inner rib 82 and backward the resin base 78, the air suctioned from the suction portion 71B is split into right and left by the lower rib 94. Then, as shown by solid arrows in FIG. 13, the air flows the outside of the inner rib 82 in the circumferential direction, and rises toward the metal sleeves 79 and 79 sides in the right and left sides of the inner rib 82. At this time, the guide rib 96 and the flow guide rib 98 on the resin base 78 introduce the air upward without causing turbulence. Especially, the upper ends of the guide rib 96 and the flow guide rib 98 are the inclined surfaces 96a and 98a toward the metal sleeve 79. Therefore, the air passing between the guide rib 96 and the flow guide rib 98 is introduced upward smoothly.

Figure 14:
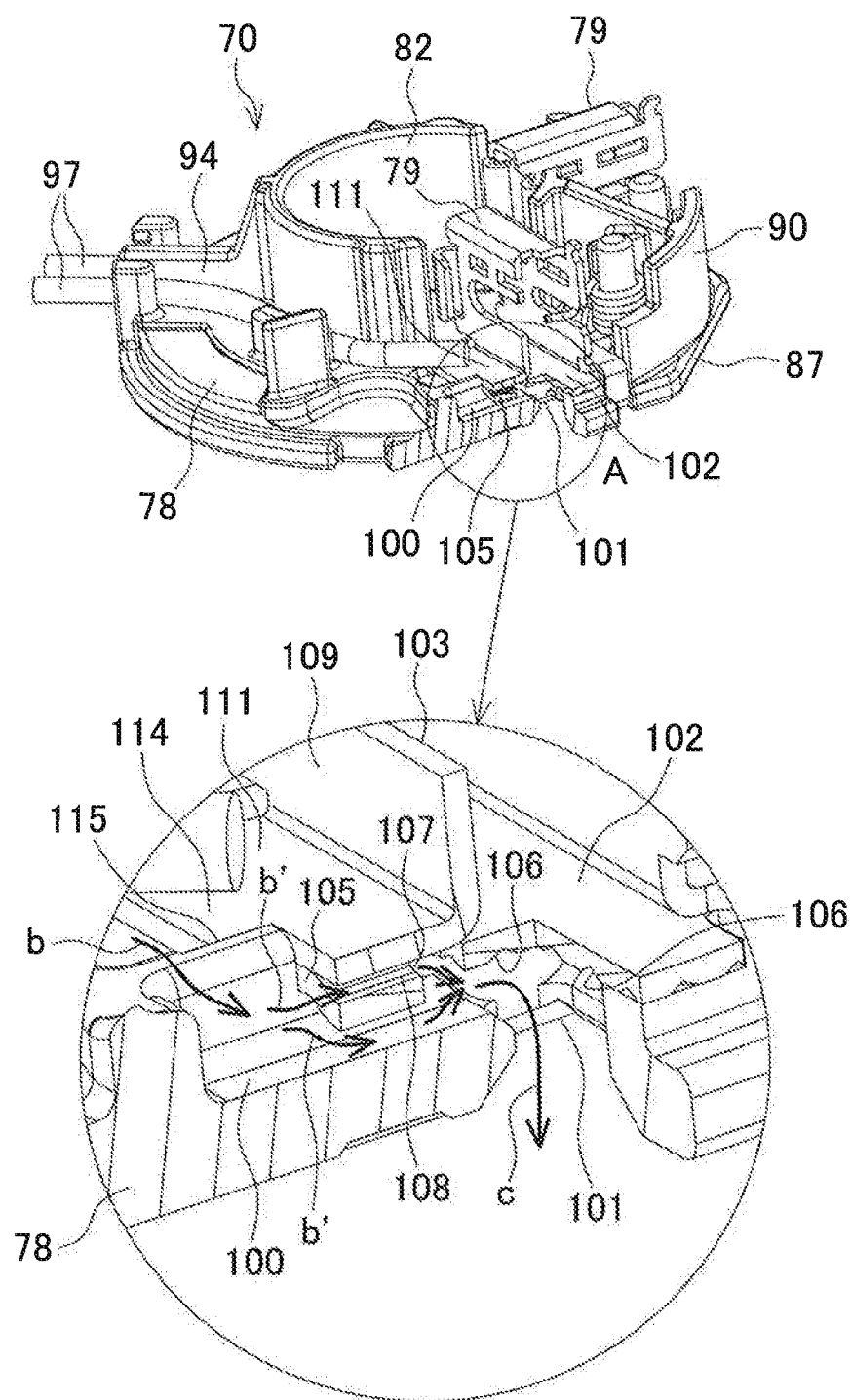
FIG. 14 is an explanatory view indicating a ventilation passage of the holder base.

Then, while a part of the air reached the metal sleeve 79 from the lower side goes to the center side along with the lower sidewall 109 of the metal sleeve 79 and flows forward passing the outside of the commutator 13 from the opening 88 of the inner rib 82 (arrow a), a part of the remaining air flows into the depressed grooves 100 and 100 exposed to the lower side of the metal sleeve 79 from the end portion (arrow b), and as shown in FIG. 14 and FIG. 6, is discharged forward from the opening portion 101 passing the back surface of the holder base 102 (arrow c). This airflow cools the holder base 102. Especially, the back surface of the holder base 102 has a large surface area because of the V-shaped cuts 106. This realizes the large cooling effect. Since the momentum of the risen air of the arrow b is once weakened by colliding to the turbulence rib 99 outside the depressed groove 100, the air is suctioned easily into the depressed groove 100 without passing the depressed groove 100.

In the above embodiment, at the holder base 102, the groove 108 and the through hole 107 of the flange portion 105 are communicating with an inside of the depressed groove 100. Therefore, the air of the arrow b flew into the depressed groove 100 is split into the upper and the lower at a position of the flange portion 105 (arrow b'). While the upper side air passes the groove 108 at an upper side of the flange portion 105 and leads from the through hole 107 to the opening portion 101, the lower side air passes a lower side of the flange portion 105 to the opening portion 101. Accordingly, not only both front and back surfaces of the flange portion 105 of the holder base 102 but also the folded portion 111 of the upper cylinder 103 is cooled effectively. Especially, since the flow passage cross-sectional area of the ventilation passage split into the upper and the lower inside the depressed groove 100 is narrowed by the flange portion 105, the flow rate of the air passing the flange portion 105 becomes higher, so that the heat radiation effect of the flange portion 105 is enhanced.

On the other hand, since the upper suction portion 71A is positioned backward the resin base 78 between the inner rib 82 and the outer rib 90, the air suctioned from the suction portion 71A is split into right and left by the upper rib 89. Then, as shown by dotted arrows in FIG. 13, the air is introduced to the right and left metal sleeves 79 and 79 sides by the inclined ribs 91 and 91 respectively. Here, while a part of the air goes to the center side along with the upper sidewall 109 of the metal sleeve 79 and flows forward passing the outside of the commutator 13 from the opening 88 of the inner rib 82 (arrow d), a part of the remaining air flows into the depressed grooves 100 and 100 exposed to an upper side of the metal sleeve 79 from the end portion, and is discharged forward from the opening portion 101 passing the back surface of the holder base 102. As identical to the above-described case, after the air flew into the depressed groove 100 splits into the upper and the lower at the position of the flange portion 105 to flow upper and lower of the flange portion 105, and is discharged from the opening portion 101. Accordingly, not only both front and back surfaces of the flange portion 105 of the holder base 102 but also the folded portion 111 of the upper cylinder 103 is cooled effectively. Since the air flowing in the circumferential direction of the resin base 78 with passing over the metal sleeve 79 from the upper side (arrow e) gets in contact with the turbulence rib 99, the momentum of the air is weakened. Therefore, the air flows easily into an end portion of the depressed groove 100 below the metal sleeve 79.

Thus, according to the vibration driver drill 1 with the above-described configuration, the resin base 78 includes the opening portion 101 that causes the holder base 102 of the metal sleeve 79 to be exposed to the opposing surface to the holding surface of the metal sleeve 79. Accordingly, the air contacts with the metal sleeve 79 even on the opposing surface to the holding surface of the metal sleeve 79 on the resin base 78. This realizes the heat radiation effect of the metal sleeve 79 to cool the metal sleeve 79 effectively.

Especially, in the embodiment, while the inside fan 69 is disposed at the commutator motor 9, the brush holder 70 is disposed at the inside fan 69 side in a direction that the resin base 78 is disposed. Then, rotation of the inside fan 69 causes the air suctioned from the suction portions 71A and 71B, which are disposed to the rear cover 7 at the metal sleeve 79 side, to pass the brush holder 70 and the commutator 13, and to be discharged from the exhaust outlet 73, which is disposed to the main body housing at the inside fan 69 side. Then, the air suctioned from the suction portions 71A and 71B contacts the holder base 102 via the opening portion 101 while passing through the brush holder 70. Accordingly, the metal sleeve 79 is cooled effectively even if the resin base 78 exists between the metal sleeve 79 and the inside fan 69.

In the embodiment, since the resin base 78 includes a ventilation passage (depressed groove 100) leading from the rear surface side to the opening portion 101, airflow generates at a bottom face of the metal sleeve 79 so that the cooling effect of the metal sleeve 79 is enhanced.

The holder base 102 of the metal sleeve 79 includes the flange portion 105 projecting to the inside of the depressed groove 100. Therefore, the contacted area with the airflow inside the depressed groove 100 is extended to enhance the heat radiation effect. Furthermore, the back surface of the holder base 102 includes unevenness provided by the cuts 106. Therefore, the contacted area of the holder base 102 with the airflow is extended to enhance the heat radiation effect.

On the other hand, at the rear surface side, the resin base 78 includes the turbulence rib 99 with which the air suctioned from the suction portions 71A and 71B collide near the inlet of the depressed groove 100. Therefore, the momentum of the air colliding with the turbulence rib 99 is weakened to make easy for the air to flow into the depressed groove 100.

Then, in the embodiment, the resin base 78 integrally includes the flow guide portion (guide rib 96 and flow guide rib 98) for guiding the air suctioned from the suction portion 71B to the metal sleeve 79 side. Therefore, the air is the air introduced by the guide rib 96 and the flow guide rib 98 to cool the metal sleeve 79 effectively. In addition, the guide rib 96 and the flow guide rib 98 are formed easily.

Figure 15B:
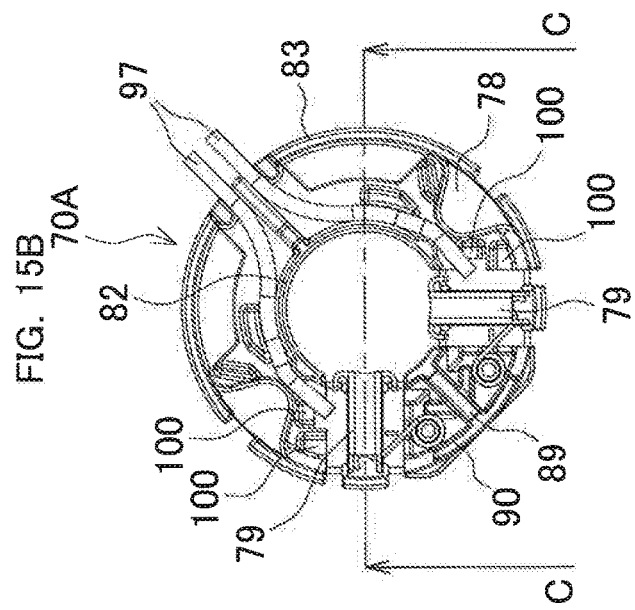
FIGS. 15A to 15C are explanatory views of the brush holder in a modification.
Figure 15C:
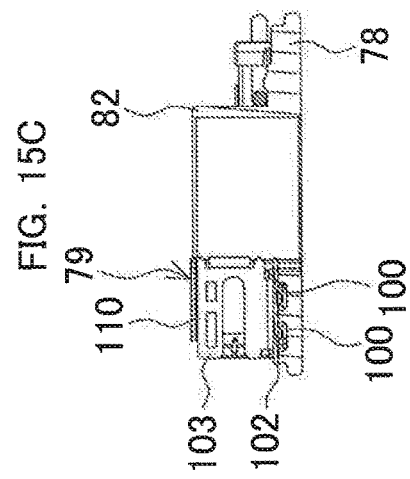
Figure 15A:
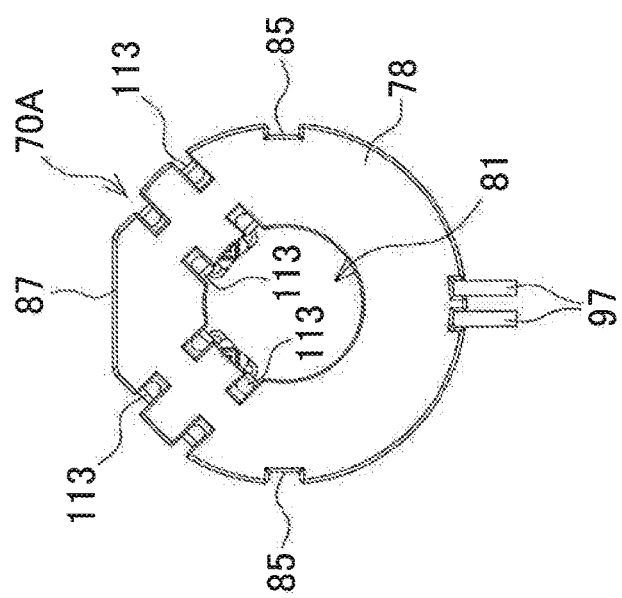

In the above-described embodiment, the opening portion is disposed on the resin base 78. However, as a brush holder 70A shown in FIGS. 15A to 15C, a configuration that only the depressed grooves 100 and 100 passing the rear side of the holder base 102 of the metal sleeve 79 are disposed without the opening portion on the resin base 78 may be employed. Thus, even when the ventilation passage (depressed groove 100) is formed (or provided) between the holder base 102 of the metal sleeve 79 and the resin base 78, the air passes through inside the depressed groove 100 to contact the back surface of the holder base 102. Therefore, the cooling effect of the metal sleeve 79 is realized.

The configuration of the ventilation passage is not limited to the configuration constituted of the above-described two depressed grooves. A configuration with increasing or decreasing the number of the depressed groove, and a configuration with changing the cross-sectional shape (passage shape) may be employed. The ventilation passage may be formed in arc-shaped along with not the tangent line direction but the circumferential direction of the inner rib. When the opening portion is disposed, the number and the shape of the opening portion can be changed as necessary.

The metal sleeve with the upper cylinder integrated with the holder base may be employed and the metal sleeve without the flange portion is also applicable. The shape of the unevenness disposed on the bottom face of the metal sleeve can be changed of course. The unevenness can be disposed not the whole bottom face but only the part that the opening portion is formed partially. The unevenness may be omitted.

Furthermore, the arrangement of the metal sleeve and the shape of the resin base can be changed as necessary. The electric power tool is not limited to the vibration driver drill. If the electric power tool includes the commutator motor and the brush holder that holds the metal sleeve for housing the brush on one surface side of the resin base, the present invention is applicable to other models such as an impact driver.

The invention also provides following aspects.

A second aspect of the invention is as follows. In the above configuration, the resin base includes a ventilation passage leading from the one surface side holding the metal sleeve to the opening portion.

A third aspect of the invention is as follows. In the above configuration, the metal sleeve includes a flange portion projecting to an inside of the ventilation passage.

A fourth aspect of the invention is as follows. In the above configuration, the flange portion includes a through hole at its base part, and the flange portion includes a groove communicating with the through hole so that the air inside the ventilation passage passes through both front and back surfaces of the flange portion.

A fifth aspect of the invention is as follows. In the above configuration, the resin base includes a turbulence rib at the one surface side holding the metal sleeve, and the turbulence rib causes the air suctioned from the air intake opening to collide with the turbulence rib near an inlet of the ventilation passage.

A sixth aspect of the invention is as follows. In the above configuration, the metal sleeve has a bottom surface with a portion exposed to the opening portion, and the bottom surface has unevenness at least at the exposed portion.

A seventh aspect of the invention is as follows. In the above configuration, the ventilation passage is configured to be in a direction perpendicular to an arrangement direction of the metal sleeve at the one surface side of the resin base holding the metal sleeve, and the ventilation passage is a depressed groove with both ends exposed to both side of the metal sleeve.

An eighth aspect of the invention is as follows. In the above configuration, the resin base integrally includes a flow guide portion that guides the air suctioned from the air intake opening to the metal sleeve side.

A ninth aspect of the invention is as follows. In the above configuration, the flow guide portion is used to fix a lead wire coupled to the metal sleeve.

To achieve the above-described object, a tenth aspect of the invention is an electric power tool that includes a housing, a commutator motor, and a brush holder. The commutator motor is disposed in the housing and includes a fan. The brush holder is disposed in the housing, and includes a metal sleeve and a resin base. The metal sleeve houses a brush, and the resin base holds the metal sleeve at one surface side. The brush holder is arranged in a direction that the resin base is disposed at the fan side. With rotation of the fan, the air suctioned from an air intake opening disposed in the housing at the metal sleeve side is discharged from an exhaust outlet disposed in the housing at the fan side after passing through the brush holder and a commutator. A ventilation passage through which the air suctioned from the air intake opening passes is formed (or provided) between the metal sleeve and the resin base.

To achieve the above-described object, an eleventh aspect of the invention is an electric power tool that includes a housing, a commutator motor, and a brush holder. The commutator motor is disposed in the housing and includes a fan. The brush holder is disposed in the housing, and includes a metal sleeve and a resin base. The metal sleeve houses a brush, and the resin base holds the metal sleeve at one surface side. The brush holder is arranged in a direction that the resin base is disposed at the fan side. With rotation of the fan, the air suctioned from an air intake opening disposed in the housing at the metal sleeve side is discharged from an exhaust outlet disposed in the housing at the fan side after passing through the brush holder and a commutator. The resin base integrally includes a flow guide portion that guides the air suctioned from the air intake opening to the metal sleeve side.

According to the first aspect of the invention, since the opening portion is disposed on the resin base of the brush holder, the air contacts with the metal sleeve even at the opposite side surface of the surface of the resin base holding the metal sleeve. Accordingly, a heat radiation effect of the metal sleeve is obtained for cooling effectively.

When the air suctioned from the air intake opening passes through the brush holder, the air contacts with the metal sleeve via the opening portion. Accordingly, even if the resin base exists between the metal sleeve and the fan, the metal sleeve can be cooled effectively.

Especially, according to the second aspect of the invention, in addition to the above-described effect, since the ventilation passage leading to the opening portion is formed (or provided) on the resin base, airflow generates at a bottom face of the metal sleeve, so that the cooling effect to the metal sleeve is enhanced.

Especially, according to the third aspect of the invention, in addition to the above-described effect, since the flange portion projecting to the inside of the ventilation passage is disposed on the metal sleeve, the contacted area of the airflow in the ventilation passage with the metal sleeve extends, so that the heat radiation effect is enhanced.

Especially, according to the fifth aspect of the invention, in addition to the above-described effect, since the turbulence rib is disposed on the resin base, the momentum of the air colliding with the turbulence rib is weakened, so that the air flows easier into the ventilation passage.

Especially, according to the sixth aspect of the invention, in addition to the above-described effect, since the unevenness is formed at the bottom face of the metal sleeve, the contacted area of the bottom face of the metal sleeve with the airflow extends, so that the heat radiation effect is enhanced.

According to the tenth aspect of the invention, since the ventilation passage is formed (or provided) between the metal sleeve and the resin base, the air contacts with the bottom face of the metal sleeve passing through the ventilation passage. Therefore, the cooling effect to the metal sleeve is obtained.

According to the eleventh aspect of the invention, the air introduced by the flow guide portion can cool the metal sleeve effectively and the flow guide portion can be formed easily.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool, comprising: a housing having an air intake opening and an air exhaust opening; a commutator motor (1) housed in the housing, (2) including a stator and a rotator, and (3) having a longitudinal axis; a bearing; a fan housed in the housing and connected to the rotator; and a brush holder (1) housed in the housing and (2) having first and second opposite side surfaces spaced along the longitudinal axis of the commutator motor; wherein: the rotator includes a commutator and a rotating shaft; the brush holder includes a resin base, a metal sleeve held by the resin base, and a brush abutting the commutator; the resin base includes a rib; the air intake opening is located in the housing at the first side surface of the brush holder; the air exhaust opening is located in the housing at the second side surface of the brush holder; the bearing is held by the rotating shaft and the housing; the fan is located at the second side surface; and the housing, the fan and the brush holder are configured such that air flow due to the fan enters the housing through the air inlet opening, is directed by the rib to cool the metal sleeve, passes through the resin base, and is discharged through the air exhaust opening.

2. The electric power tool according to claim 1, wherein the resin base includes a ventilation passage leading from the first side surface to the metal sleeve.

3. The electric power tool according to claim 2, wherein the metal sleeve includes a flange portion projecting to an inside of the ventilation passage.

4. The electric power tool according to claim 3, wherein the flange portion includes (1) a base part, (2) a through hole at the base part, and
(3) a groove communicating with the through hole to ensure that air inside the ventilation passage passes past both front and back surfaces of the flange portion.

5. The electric power tool according to claim 2, wherein:
the resin base includes a turbulence rib at the first side surface; and
the turbulence rib causes air from the air intake opening to collide with the turbulence rib near an inlet of the ventilation passage.

6. The electric power tool according to claim 1, wherein:
the resin base has an opening therethrough; and the metal sleeve has a bottom surface with a portion (1) exposed to the opening and (2) that has unevenness.

7. The electric power tool according to claim 2, wherein the resin base is configured such that the ventilation passage is (1) perpendicular to the metal sleeve at the first side surface and (2) is a depressed groove having its ends exposed to both sides of the metal sleeve.

8. The electric power tool according to claim 1, wherein the resin base includes a flow guide portion that guides air from the air intake opening to the metal sleeve.

9. The electric power tool according to claim 8, wherein the flow guide portion fixes a lead wire to the metal sleeve.

10. An electric power tool, comprising: a housing having an air intake opening and an air exhaust opening; a commutator motor (1) housed in the housing, (2) including a stator and a rotator, and (3) having a longitudinal axis; a brush holder (1) housed in the housing and (2) having first and second opposite side surfaces spaced along the longitudinal axis of the commutator motor; and a fan housed in the housing and connected to the rotator; wherein: the rotator includes a commutator and a rotating shaft; the brush holder includes a resin base, a metal sleeve held by the resin base, and a brush abutting the commutator; a ventilation passage is formed by and between the resin base and the metal sleeve; the air intake opening is located in the housing at the first side surface of the brush holder; the air exhaust opening is located in the housing at the second side surface; the resin base includes a rib; the fan is located on the second side surface; and the housing, the fan and the brush holder are configured such that air flow due to the fan enters the housing through the air inlet opening, is directed by the rib and flows through the ventilation passage to cool the metal sleeve, and is discharged through the air exhaust opening.

11. An electric power tool, comprising:
a housing having an air intake opening and an air exhaust opening;
a commutator motor (1) housed in the housing, (2) including a stator and a rotator, and (3) having a longitudinal axis;
a brush holder (1) housed in the housing and (2) having first and second opposite side surfaces spaced along the longitudinal axis of the commutator motor; and
a fan housed in the housing and connected to the rotator; wherein:
the brush holder includes a resin base, a metal sleeve held by the resin base, and a brush abutting the commutator;
the air intake opening is located in the housing at the first side surface of the brush holder;
the air exhaust opening is located in the housing at the second side surface of the brush holder;
the resin base includes a rib;
the fan is located on the second side surface; and
the housing, the fan and the brush holder are configured such that air flow due to the fan enters the housing through the air inlet opening, is directed by the rib to cool the metal sleeve, passes through the resin base, and is discharged from the housing through the air exhaust opening.

12. The electric power tool according to claim 11, wherein the rib (1) is located outwardly from the commutator and (2) has a cylindrical shape.

13. The electric power tool according to claim 11, wherein the rib extends radially.

14. The electric power tool according to claim 11, wherein the rib is inclined in a direction approaching to a radial direction.

15. The electric power tool according to claim 10, wherein:
the resin base includes an opening therethrough; and
the air flow due to the fan passes through the opening.

16. The electric power tool according to claim 10, wherein the air flow due to the fan is split to pass through the ventilation passage.

* * * * *